O. H. PASCHKE.
CONCAVE FOR THRESHING MACHINES.
APPLICATION FILED JUNE 30, 1908.
941,037.
Patented Nov. 23, 1909.
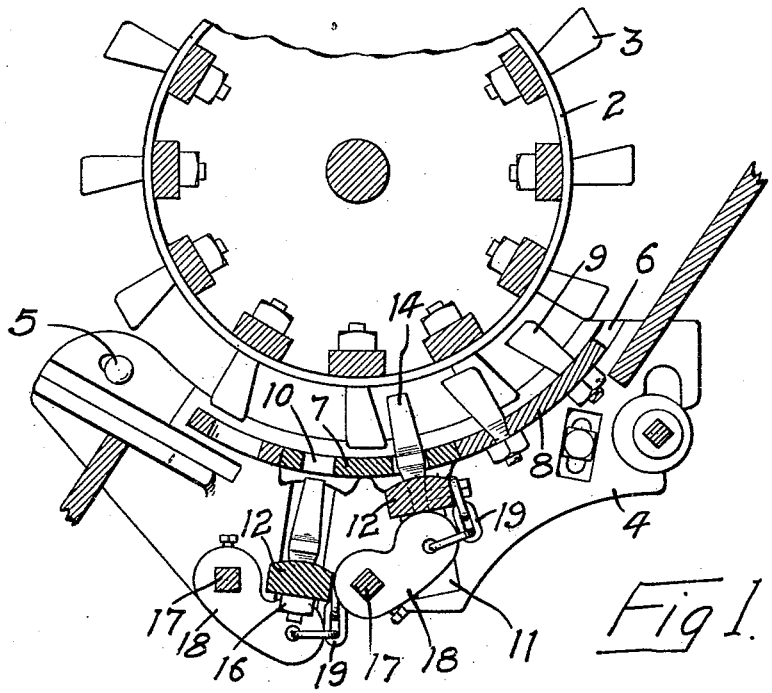
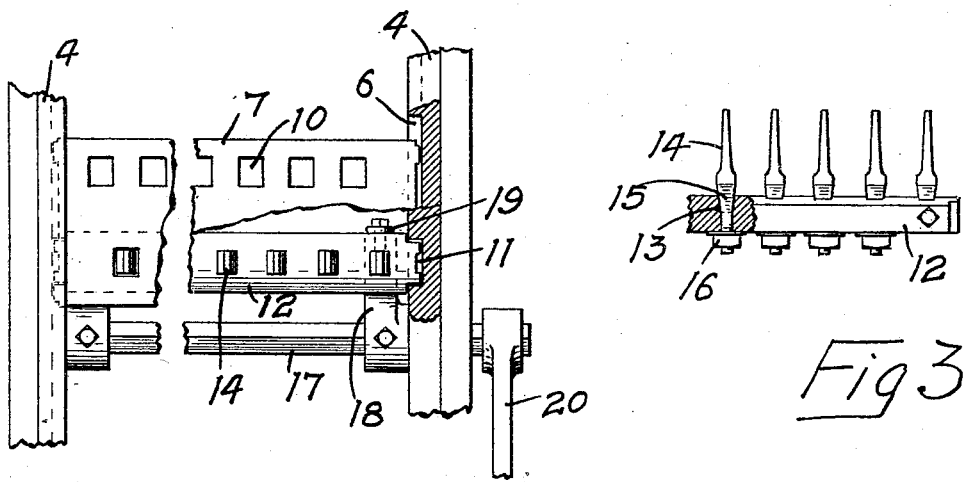
WITNESSES
INVENTOR
OTTO H. PASCHKE
BY Paul & Paul
HIS ATTORNEYS

UNITED STATES PATENT OFFICE.

OTTO H. PASCHKE, OF LYND, MINNESOTA.

CONCAVE FOR THRESHING-MACHINES.

941,037.

Specification of Letters Patent. Patented Nov. 23, 1909.

Application filed June 30, 1908. Serial No. 441,223.

*To all whom it may concern:*

Be it known that I, OTTO H. PASCHKE, of Lynd, Lyon county, Minnesota, have invented certain new and useful Improvements in Concaves for Threshing-Machines, of which the following is a specification.

The object of this invention is to provide means whereby the number of effective teeth in the concave can be readily increased or decreased during the operation of the machine.

A further object is to provide a concave of simple durable construction and one which can be manufactured and applied to a threshing machine at a comparatively small expense.

The invention consists generally in various constructions and combinations, all as hereinafter described and particularly pointed out in the claims.

In the accompanying drawings, forming part of this specification, Figure 1 is a transverse sectional view through a cylinder and concave embodying my invention. Fig. 2 is a detailed sectional view looking down on the concave section through which the teeth are adjustable. Fig. 3 is a detailed view showing the manner of mounting the teeth in their supporting bars.

In the drawing, 2 represents a threshing cylinder having a series of teeth 3.

4 represents the end plates, supporting the concave pivoted at 5 and having a swinging movement in a vertical plane toward and from the threshing cylinder whereby I am able to change the pitch of all the teeth at once and provide more space for tangled or wet grain. These plates are provided with curved ways or grooves 6 in which the sections 7 and 8 of the concave are adapted to slide one section being pushed into the grooves ahead of the other until the desired number of sections are in place. Section 8 has a series of teeth 9 mounted therein, while the section 7 is provided with a series of holes 10. Beneath the section 7, vertical guide ways 11 are provided in the end plates 4 wherein bars 12 are slidable toward and from the concave 7. These bars are rounding on top to prevent clogging and resting on convex cams to hold the bars in place so that the teeth will not bend, break or work loose and the bars are provided with sockets 13 in which teeth 14 are mounted, said teeth having tapered shanks 15 fitting the correspondingly shaped sockets in the bars, and removably secured therein by nuts 16. These teeth are below the holes 10 in the concave 7, and when the bars are raised, will enter said oblong holes and project there through above the concave 7, the degree of such projection depending upon the elevation of the bars. One of these bars may be raised or both of them as desired. The bars are raised to utilize the teeth 14 whenever the condition of the grain requires their use. In some kinds of grain, the single stationary concave may be sufficient, while at times, the operator may desire to employ both sets of concaves. For the purpose of raising the bars 12, I provide shafts 17 whereon curved arms 18 are mounted, said arms being adapted to engage the bars and raise them in their guide ways to project their teeth through the holes in the concave. These arms are made in such form, that is, curved, because the space is very limited in some machines. The arms have linked connections 19 with both ends of the bars for the purpose of drawing them down evenly when the shaft is rocked to lower the arms. Similar operating means is provided for both bars, and operating levers 20 enable the operator to raise one or both of the bars instantly. When the concave sections are removed, the bars may be raised into the groove 6 and withdrawn from between the end plates 4 also.

The concave is capable of being drawn out and reversed and when this is done, the difference in distances between the rows of holes from the edges of the concave section will cause the teeth 14 to stand at a different angle when they are thrust through these holes. For instance, referring to Fig. 1, it will be noted that the blank on the left of the hole 10 is of less width than the blank on the right of this hole. Consequently, when this section 7 is removed and turned around, the position of the holes will be changed and the teeth will stand at a different angle, the shanks 15 being sufficiently loose in their sockets to allow them to rock and compensate for the variation in the location of the holes. In practice, the teeth 14 will be drawn down partially through the concave and when the pitch is changed by the reversal of the concave section, the teeth will hook in such grain as flax and timothy and retard its travel through the cylinder.

The bars supporting the teeth have rounded upper surfaces and are self cleaning and clogging of the concave will be prevented.

I claim as my invention:—

1. The combination, with a threshing cylinder, of a concave section having rows of holes therein at unequal distances from the edges of the concave section, said section being capable of reversal end for end, bars arranged below said section, teeth carried by said bars, means for raising said bars to project said teeth through the holes in said section, and said bars being sufficiently loose in their supports to allow said teeth to tilt and accommodate themselves to the different locations of the holes in said concave, substantially as described.

2. The combination, with a threshing cylinder, of end plates having curved grooves or ways therein, a concave adapted to slide in said grooves and having a series of holes therein, said end plates having vertical recesses therein communicating at their upper ends with said curved grooves, bars adapted to enter said curved grooves when said concave has been withdrawn and drop into the recesses in said end plates, a series of teeth carried by said bars and adapted to enter the holes in said concave, means for tilting said end plates to vary the position of said concave with respect to the cylinder, and independent means for raising and lowering said bars, substantially as described.

3. The combination, with a threshing cylinder, of a concave section having rows of holes therein, bars vertically movable in grooves provided below said section, teeth carried by said bars and adapted to enter the holes in said concave section, said section being reversible to alter the location of said holes and said bars rocking in said grooves to allow said teeth to accommodate themselves to the position of the holes, and means engaging said bars for raising and lowering them and said teeth.

4. The combination, with a threshing cylinder, of end plates having curved grooves or ways therein, a concave adapted to slide in said grooves and having a series of oblong holes, and a reversible bar provided beneath said concave and vertically slidable in vertical grooves provided in said end plates, and communicating with said curved grooves, a series of teeth mounted in said bar, and adapted to enter the holes in said concave and means for raising and lowering said bar to project said teeth above said concave or withdraw them and said bar being removable from its ways upon the removal of said concave from said curved way, substantially as described.

5. The combination, with a threshing cylinder, of end plates having curved grooves or ways therein, a concave adapted to slide in said grooves and having a series of holes, said end plates having vertical recesses communicating at their upper ends with said curved grooves, bars adapted to enter said curved grooves when said concave has been withdrawn and drop into the recesses in said end plates, a series of teeth carried by said bars and adapted to enter the holes in said concave, means for tilting said end plates to vary the position of said concave with respect to the cylinder, shafts arranged beneath said bars, and arms mounted on said shafts and arranged to engage said bars to elevate them when said shafts are rocked, substantially as described.

6. The combination, with a threshing cylinder, of end plates having curved grooves or ways therein, a concave adapted to slide in said grooves and having a series of holes, bars adapted to enter said curved grooves, said end plates having vertical recesses therein communicating with said curved grooves and adapted to receive said bars, the upper surfaces of said bars being rounded to prevent material from lodging thereon, a series of teeth carried by said bars and adapted to enter the holes in said concaves, means for tilting said end plates, and means for raising and lowering said bars.

7. The combination, with a threshing cylinder, of a concave section having rows of holes therein at unequal distances from the edges of the concave section, said section being capable of reversal end for end, teeth arranged below said concave, means for raising said teeth to project them through the holes in said section, and the shanks of said teeth being sufficiently loose in said holes to allow the teeth to tilt and accommodate themselves to the different locations of the holes in said concave when the concave is reversed substantially as described.

In witness whereof, I have hereunto set my hand this 26th day of June 1908.

OTTO H. PASCHKE.

Witnesses:
C. G. HANSON,
J. A. BYINGTON.